United States Patent
Lumpkin et al.

(10) Patent No.: US 11,320,360 B2
(45) Date of Patent: May 3, 2022

(54) FLUID REFRACTIVE INDEX OPTIMIZING PARTICLE COUNTER

(71) Applicant: Particle Measuring Systems, Inc., Boulder, CO (US)

(72) Inventors: James M. Lumpkin, Boulder, CO (US); Brian A. Knollenberg, Boulder, CO (US); John R. Mitchell, Boulder, CO (US)

(73) Assignee: Particle Measuring Systems, Inc., Boulder, CO (US)

(*) Notice: Subject to any disclaimer, the term of this patent is extended or adjusted under 35 U.S.C. 154(b) by 77 days.

(21) Appl. No.: 16/556,692

(22) Filed: Aug. 30, 2019

(65) Prior Publication Data
US 2020/0072729 A1 Mar. 5, 2020

Related U.S. Application Data

(60) Provisional application No. 62/725,777, filed on Aug. 31, 2018.

(51) Int. Cl.
*G01N 15/14* (2006.01)

(52) U.S. Cl.
CPC ..... *G01N 15/1434* (2013.01); *G01N 15/1425* (2013.01); *G01N 2015/1452* (2013.01); *G01N 2015/1486* (2013.01)

(58) Field of Classification Search
CPC ........... G01N 15/1425; G01N 15/1434; G01N 15/1459; G01N 2015/0046; G01N 2015/1452; G01N 2015/1486
See application file for complete search history.

(56) References Cited

U.S. PATENT DOCUMENTS

| | | | |
|---|---|---|---|
| 4,594,715 A | 6/1986 | Knollenberg | |
| 4,640,616 A * | 2/1987 | Michalik | G01N 21/43 356/136 |

(Continued)

FOREIGN PATENT DOCUMENTS

| | | |
|---|---|---|
| CN | 203310726 | 11/2013 |
| EP | 0974829 | 1/2000 |

OTHER PUBLICATIONS

Search Report and Written Opinion, dated Nov. 8, 2019, corresponding to International Application No. PCT/US2019/049135 (filed Aug. 30, 2019), 40 pp.

*Primary Examiner* — Shawn Decenzo
*Assistant Examiner* — Jarreas C Underwood
(74) *Attorney, Agent, or Firm* — Leydig, Voit & Mayer, Ltd.

(57) ABSTRACT

Provided herein are systems and methods of optical particle counters which account and adjust for the refractive index of the carrier fluid being analyzed. The provided systems are robust and may be implemented in a variety of optical particle counters including obscured light, reflected light, emitted light and scattered light particle counters. The described systems may be useful with any fluid, including gases or liquids. In some cases, the system can account for the differences in refractive index between two liquids, for example, ultrapure water and an acid, such as sulfuric, hydrochloric, hydrofluoric, acetic, phosphoric, chromic phosphoric, and the like. By accounting for the refractive index of the carrier fluid, the described systems and methods are also more sensitive and able to more accurately detect and characterize smaller particles, including nanoscale sized particles.

21 Claims, 3 Drawing Sheets

(56) References Cited

U.S. PATENT DOCUMENTS

| | | |
|---|---|---|
| 4,798,465 A | 1/1989 | Knollenberg |
| 4,893,928 A | 1/1990 | Knollenberg |
| 4,990,795 A | 2/1991 | Suzuki et al. |
| 5,268,736 A | 12/1993 | Prather |
| 5,282,151 A | 1/1994 | Knollenberg |
| 5,283,199 A | 2/1994 | Bacon, Jr. et al. |
| 5,671,046 A | 9/1997 | Knowlton |
| 5,726,753 A | 3/1998 | Sandberg |
| 5,751,422 A | 5/1998 | Mitchell |
| 5,805,281 A | 9/1998 | Knowlton et al. |
| 5,861,950 A | 1/1999 | Knowlton |
| 5,870,185 A * | 2/1999 | See .................. G01N 21/4133 356/128 |
| 5,889,589 A | 3/1999 | Sandberg |
| 5,903,338 A | 5/1999 | Mavliev et al. |
| 6,167,107 A | 12/2000 | Bates |
| 6,200,820 B1 * | 3/2001 | Hansen .................. G01N 15/14 435/6.1 |
| 6,246,474 B1 | 6/2001 | Cerni et al. |
| 6,275,290 B1 | 8/2001 | Cerni et al. |
| 6,465,802 B1 | 10/2002 | Matusda et al. |
| 6,615,679 B1 | 9/2003 | Knollenberg et al. |
| 6,709,311 B2 | 3/2004 | Cerni |
| 6,794,671 B2 | 9/2004 | Nicoli et al. |
| 6,859,277 B2 * | 2/2005 | Wagner .................. G01N 15/14 356/337 |
| 6,903,818 B2 | 6/2005 | Cerni et al. |
| 6,945,090 B2 | 9/2005 | Rodier |
| 7,016,026 B2 * | 3/2006 | DiFoggio .............. G01N 21/41 356/128 |
| 7,030,980 B1 | 4/2006 | Sehler et al. |
| 7,088,446 B2 | 8/2006 | Cerni |
| 7,088,447 B1 | 8/2006 | Bates et al. |
| 7,151,602 B2 | 12/2006 | Yamaguchi et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,456,960 B2 | 11/2008 | Cerni et al. |
| 7,460,210 B2 * | 12/2008 | Park .................... G03F 9/7026 355/53 |
| 7,576,857 B2 | 8/2009 | Wagner |
| 7,667,839 B2 | 2/2010 | Bates |
| 7,746,469 B2 | 6/2010 | Shamir et al. |
| 7,796,255 B2 | 9/2010 | Miller |
| 7,916,293 B2 * | 3/2011 | Mitchell .............. G01N 15/1463 356/336 |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,800,383 B2 | 8/2014 | Bates |
| 8,869,593 B2 | 10/2014 | Gorbunov et al. |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,818,654 B2 | 11/2017 | Hayashi et al. |
| 9,885,640 B2 | 2/2018 | Ketcham et al. |
| 9,989,462 B2 | 6/2018 | Lumpkin et al. |
| 10,197,487 B2 | 2/2019 | Knollenberg et al. |
| 10,345,200 B2 | 7/2019 | Scialo et al. |
| 10,371,620 B2 | 8/2019 | Knollenberg et al. |
| 11,009,445 B2 | 5/2021 | Matsuda et al. |
| 2005/0021244 A1 * | 1/2005 | Nicoli ................ G01N 15/0227 702/29 |
| 2005/0028593 A1 | 2/2005 | Rodier |
| 2007/0242269 A1 * | 10/2007 | Trainer .............. G01N 15/1459 356/336 |
| 2009/0078862 A1 | 3/2009 | Rodier et al. |
| 2009/0184242 A1 | 7/2009 | Howald |
| 2009/0190128 A1 | 7/2009 | Cerni et al. |
| 2009/0268202 A1 | 10/2009 | Wagner |
| 2014/0152986 A1 | 6/2014 | Trainer |
| 2015/0000595 A1 | 1/2015 | Gorbunov et al. |
| 2015/0211977 A1 * | 7/2015 | Sekimoto ........... G01N 15/1404 356/338 |
| 2015/0259723 A1 | 9/2015 | Hartigan et al. |
| 2016/0126081 A1 | 5/2016 | Gorbunov |
| 2016/0139013 A1 | 5/2016 | Gorbunov |
| 2016/0146732 A1 * | 5/2016 | Freitag ............... G01N 15/1436 356/338 |
| 2017/0105618 A1 * | 4/2017 | Schmoll ............ G01B 9/02044 |
| 2017/0176312 A1 | 6/2017 | Shamir |
| 2018/0133744 A1 | 5/2018 | Gorbunov et al. |
| 2019/0250785 A1 | 8/2019 | Pandolfi et al. |
| 2019/0323943 A1 | 10/2019 | Knollenberg et al. |

* cited by examiner

FLUID REFRACTIVE INDEX OPTIMIZING PARTICLE COUNTER

CROSS REFERENCE TO RELATED APPLICATIONS

This application claims the benefit of priority to U.S. Provisional Patent Application No. 62/725,777 filed Aug. 31, 2018, which is incorporated herein by reference in its entirety to the extent not inconsistent herewith.

BACKGROUND OF THE INVENTION

Particle counters play a key role in modern manufacturing techniques as they monitor the environment for micro- and nano-scale particles that are problematic for a variety of industries including semiconductor fabrication and pharmaceutical or biotechnology production. As manufacturing processes have advanced, the need for the detection, characterization or removal of smaller and smaller particles is necessary.

One common type of particle counter is an optical particle counter. These counters monitor a fluid stream and characterize particles therein by projecting electromagnetic radiation (typically via a laser) into a flow cell. The electromagnetic radiation interacts (scatters, reflects, is obscured by, is emitted from, etc.) with particles found within the flow cell. The electromagnetic radiation is then analyzed to determine the number or characteristics of particles present in the flow cell.

As particle size decreases, the complexity of the optical components to detect the particles increases dramatically. For the detection of particles less than 50 nm (and increasing as particle size decreases), very powerful lasers and detectors are required to be in precise alignment in order to accurately detect and characterize particles, often requiring extensive calibration to be effective and accurate. However, many industries use a variety of different fluids within their cleanroom or controlled environments and a change in refractive index of the fluid being analyzed may reduce or eliminate the efficacy of the particle detector because the change in refractive index alters the path of the electromagnetic radiation as it passes through the flow cell. The change in path alters the ideal point of measurement (focal point) for the collection and/or detection system analyzing the electromagnetic radiation and may no longer be able to provide accurate characterization of the particles passing through the flow cell. While the particle counter may, in some cases, be manually recalibrated, calibration would be needed each time a fluid with a different refractive index was analyzed with the particle counter. Calibration is time consuming, expensive and requires taking the particle counter offline.

As can be seen from the foregoing, there remains a need in the art for optical particle counting systems that may be used with different liquid carrier fluids without the need for recalibration, accomplished by accounting for refractive index of the carrier fluid. Further, there is a need for advanced optical particle counting systems capable of detecting nanoscale particles (e.g. less than 100 nm, more desirably less than 50 nm, in some cases less than 20 nm) and that are compatible with multiple carrier fluid compositions.

BRIEF SUMMARY OF THE INVENTION

Provided herein are optical particle analyzers or counters, and related methods of using, that account and adjust for the refractive index of the carrier fluid being analyzed. The analyzers are robust and may be implemented in a variety of optical particle counters including obscured light, reflected light, emitted light and scattered light particle counters. The analyzers may be useful with any fluid, including gases or liquids. In some cases, the analyzers can account for the differences in refractive index between two liquids, for example, ultrapure water and an acid (e.g. sulfuric, hydrochloric, hydrofluoric, acetic, phosphoric, chromic phosphoric, etc.). The analyzer may be configured to account for differences in refractive index between different fluids, including spanning liquids and gases. By accounting for the refractive index of the carrier fluid, the described analyzers and methods are also more sensitive and able to detect and characterize smaller particles (e.g. nanoscale) more accurately and reliably.

By accounting for refractive index, the described systems and methods may also optimize channel settings for the characterization of particles. Since the refractive index is known (such as by knowing the fluid composition and/or by measuring index of refraction with an instrument such as a refractometer), not only is particle detection improved, but the size or size range determined by the particle counter may be more accurate.

In an aspect, provided is an optical particle analyzer comprising: i) an optical source (e.g., a laser or LED(s)) for generating a beam of electromagnetic radiation; ii) a flow chamber for flowing a fluid containing particles along a flow direction through the beam of electromagnetic radiation, thereby generating scattered or emitted electromagnetic radiation; iii) an optical collection system for collecting and directing the scattered or emitted electromagnetic radiation from a viewing region containing the particles (if present) onto a detector; and iv) a refractive index optimizer operably connected, including in optical communication, to one or more of the laser, the optical collection system or the detector to optimize the collection of the electromagnetic radiation by the detector. In this manner, the refractive index optimizer, in combination with and control of the other optical components, is configured to control a focal point of the beam of electromagnetic radiation in the flowing fluid of particles based on a refractive index of the flowing fluid and optimizes the collection of the electromagnetic radiation by the detector. Not only can the beam of electromagnetic radiation be appropriately focused on the desired viewing region, including corresponding to a desired portion of the flow cell, but the collected radiation after interaction with the fluid sample, can be appropriately focused on the detector, thereby increasing sensitivity, resolution, and/or accuracy of the particle analyzer.

The analyzers and methods described herein may quickly and automatically account for changes in refractive index in a number of ways. For example, the analyzer may have a positioner or motor or other means for shifting the position or angle of any of the components, including, for example, the optical source or optical component, including the electromagnetic radiation collection system. The analyzer may also adjust the optical source (e.g. laser) by altering the beam shape, beam position or beam intensity. Each of these accounts for a change in refractive index by optimizing the point of focus of the beam and collection/detection system irrespective of the fluid refractive index. The positioner or motor may be configured to provide millimeter to micron range positioning, such as between 10 mm and 0.1 µm. The amount of motion required depends on the expected different indices of refraction encountered. For smaller differences where there is little difference in the refractive index, smaller motion may be required in order to achieve the desired optimization. Larger differences may require relatively larger motions. Accordingly, various positioners or motors may be utilized, such as picomotor translation stages, rack and pinion worm gears and/or linear actuators. Similarly, the angle of adjustment, such as for mirrors, lenses, or optical sources, may range from 10° to 0.01°, and may use rotary picomotor stages that can account for very little, but significant, refractive index differences between fluids.

The refractive index optimizer may be a beam shaping optical assembly positioned between, such as in an optical sense, the optical laser and the flow chamber, wherein the refractive index optimizer adjusts a beam shape or a beam position of the electromagnetic radiation in the flow chamber to optimize the collection of the electromagnetic radiation.

The refractive index optimizer may be operably connected to the laser and adjusts a position of the laser relative to the flow chamber to optimize the collection of the electromagnetic radiation. The adjustment can be by any means known in the art. For example, a positioner such as an electrical motor, piezoelectric actuator, translation stages, micrometer, picometer or the like, may be used to reliably position an optical component, such as the optical source, including a laser. The adjustment of the laser orientation, in turn, adjusts a direction of the beam of electromagnetic radiation and, thereby, accounts for the refractive index of the fluid (e.g., liquid or gas composition) to ensure a focal point of the beam intersects with the viewing window.

The analyzers and methods described herein are also compatible with positioners or controllers that position or control optical components that are optically downstream of the light source. For example, optical mirrors, lenses, or the like can be controlled via motors, positioners and/or actuators to change the beam of electromagnetic radiation (including position), instead of controlling the optical source position.

The refractive index optimizer may be operably connected to the collection system and adjusts a depth of focus of the collection system relative to the flow chamber to optimize the collection of the electromagnetic radiation. This operable connection may refer to a lens position control and/or control of a lens curvature or type (including by swapping out lenses or control of a curvature-controllable lens).

The refractive index optimizer may be operably connected to the detector and adjust a position of the detector relative to the flow chamber to optimize the collection of the electromagnetic radiation, such as by any one or more of a motor, a positioner, or an actuator.

The refractive index optimizer may adjust the positions of the laser, the collection system or the detector in the x-axis, the y-axis, the z-axis or any combination thereof. The refractive index optimizer may maximize an output signal from the detector.

Various methods may be used to provide the analyzers described herein with an actual or estimated refractive index of the fluid being analyzed. The refractive index may be input into the optical particle counter or the refractive index optimizer by a user, for example, where the refractive index is provided as a number or the fluid composition and/or concentration is provided and the refractive index is determined from a lookup table.

The analyzers and methods may further comprise a refractometer operably connected to the flow chamber, or more specifically the fluid introduced to the flow chamber, and the refractive index optimizer; wherein the refractometer provides the refractive index to the refractive index optimizer. The described analyzers and methods may further comprise a processor operably connected to optical particle counter and the refractive index optimizer; wherein the optical particle counter acts as a refractometer. The refractive index optimizer may optimize the collection of electromagnetic radiation at a refractive index selected from the range of 1.3 to 1.6. The refractive index optimizer may provide Contrast Detection Auto-Focusing (CDAF) or Phase Detection Auto-Focusing (PDAF).

Any of the devices and methods provided herein preferably comprise a processor to facilitate automation of the device or method. For example, based on a known or measured index of refraction input to the processor, the processer may determine a focal point, including in the context of sending a control signal to the refractive index optimizer to control one or more incoming beam direction, such as optical light source position and orientation, beam shape, optical collection system configuration, and/or detector position, thereby avoiding active user intervention. "Optical collection system configuration" may be expressed in terms of an optical parameter, including position/orientation of an optical component of the optical collection system and/or type of optical component such as lens type or lens geometry.

In an aspect, provided is an optical particle analyzer, including a counter, comprising: i) a laser for generating a beam of electromagnetic radiation; ii) a flow chamber for flowing a fluid containing particles along a flow direction through the beam of electromagnetic radiation, thereby generating scattered or emitted electromagnetic radiation; iii) an optical collection system for collecting and directing the scattered or emitted electromagnetic radiation from a viewing region onto a detector; iv) a beam shaping optical assembly operably connected to the laser, wherein the beam shaping optical assembly adjusts a beam shape or a beam position of the electromagnetic radiation; wherein the beam shaping optical assembly adjust the beam shape or the beam position based on the refractive index of the fluid.

The optical particle analyzer may further comprise a refractometer operably connected to the flow chamber for determining a refractive index of the fluid; and a processor operably connected to the refractometer and the beam shaping optical assembly which adjusts the beam shape or beam position based on the refractive index determined by the refractometer.

In an aspect, provided is a method for maximizing the signal output of an optical particle counter comprising the steps of: i) providing an optical particle counter comprising: a) a laser for generating a beam of electromagnetic radiation; b) a flow chamber for flowing a fluid containing particles along a flow direction through the beam of electromagnetic radiation, thereby generating scattered or emitted electromagnetic radiation; c) an optical collection system for collecting and directing the scattered or emitted electromagnetic radiation from a viewing region onto a detector; d) a beam shaping optical assembly operably connected to the laser; ii) measuring the refractive index of the fluid in the flow chamber; iii) adjusting at least one of: the beam shaping optical assembly to a beam shape and/or a beam position of the electromagnetic radiation entering the flow chamber based on the measured refractive index; or a position of the laser, the optical collection system, the detector or any combination thereof based on the measured refractive index to optimize the depth of focus of the electromagnetic radiation entering the flow chamber and imparted to the detector, thereby increasing the amount of electromagnetic radiation reaching the detector and maximizing said signal output of said optical particle counter.

The refractive index may be automatically measured by a refractometer operably connected to the fluid. This aspect is preferred in situations where a user does not need to determine the fluid composition, or the fluid composition may change with time, including batch-to-batch variation or an instrument that commonly encounters different fluid compositions. In other words, the refractive index may be a time-varying refractive index, where depending on the application of interest, the fluid composition may change sufficiently over time that the refractive index changes over time.

The method is, however, compatible with a refractive index that is manually determined by introducing a fluid having a known refractive index to the flow chamber. For example, if a user is provided the fluid composition, the refractive index of that fluid may be looked-up instead of measured, with a corresponding input to the particle analyzer of the refractive index optimizer. Accordingly, the method may further comprise the step of determining the value of the refractive index by a look-up table and manually inputting the value of the refractive index to the particle analyzer.

The method may further comprise adjusting a beam shaping optical assembly to provide an optimized beam shape and/or a beam position of said electromagnetic radiation entering said flow chamber based on the refractive index.

The method may further comprise adjusting a position of the laser, optical collection system, detector or any combination thereof.

In an aspect, provided is a method for maximizing the signal output of an optical particle counter comprising the steps of: i) providing an optical particle counter comprising: a) a laser for generating a beam of electromagnetic radiation; b) a flow chamber for flowing a fluid containing particles along a flow direction through the beam of electromagnetic radiation, thereby generating scattered or emitted electromagnetic radiation; c) an optical collection system for collecting and directing the scattered or emitted electromagnetic radiation from a viewing region onto a detector; ii) measuring the refractive index of the fluid in the flow chamber; iii) adjusting the position of the laser, the optical collection system, the detector or any combination thereof to optimize the depth of focus of the electromagnetic radiation entering the flow chamber, thereby increasing the amount of electromagnetic radiation reaching the detector and maximizing the signal output of the optical particle counter.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE SEVERAL VIEWS OF THE DRAWING(S)

FIG. 3 compares particles detected by an optical particle in sulfuric acid. The left column represents the number of particles detected using a particle counter specifically calibrated to detect in a high index of refraction (~1.6), while the right represents analysis of the same fluid using a particle counter calibrated to detect particles in a low index of refraction fluid (~1.3), such as water. The difference in magnitude reflects that counts can be seriously and significantly impacted if the refractive index of the carrier fluid is not accounted for.

DETAILED DESCRIPTION OF THE INVENTION

In general, the terms and phrases used herein have their art-recognized meaning, which can be found by reference to standard texts, journal references and contexts known to those skilled in the art. The following definitions are provided to clarify their specific use in the context of the invention.

"Refractive Index Optimizer" refers to a system or sub-system provided in an optical particle counter that allows for the movement of the focal point of the optics of the particle counter based on the refractive index of the carrier fluid being analyzed by the particle counter. The refractive index optimizer may use a motor, electronic device, other movement system, a series thereof to adjust the positions or angles of the optical systems (e.g. source, collection system, detector, beam shaping system, etc.) with relation to one and other or with relation to the flow cell. The refractive index optimizer may also adjust a beam shaping system or the optical source alter the beam shape, beam intensity or beam target within the flow cell. The refractive index optimizer may include a control unit, one or more motors, a display, an input (e.g. a keyboard or touchscreen or a data link to another device such as a computer or smart phone), a processor and/or a refractometer.

"Flow direction" refers to an axis parallel to the direction the bulk of a fluid is moving when a fluid is flowing. For fluid flowing through a straight flow cell, the flow direction is parallel to the path the bulk of the fluid takes. For fluid flowing through a curved flow cell, the flow direction may be considered tangential to the path the bulk of the fluid takes.

"Optical communication" refers to components that are arranged in a manner that allows light or electromagnetic radiation to transfer between the components.

"Optical component" is used broadly herein to refer to a component useful in generating, controlling/directing, and detecting electromagnetic radiation, specifically the electromagnetic radiation introduced to the fluid sample and that has interacted with the fluid, including any particles suspended in the fluid. Examples include mirrors, lenses and filters.

"Operably connected" is used broadly herein to refer to a configuration of elements, wherein an action or reaction of one element affects another element, but in a manner that preserves each element's functionality. For example, the term can include elements that are in optical communication with one another and not necessarily in physical contact. For example, the refractive index optimizer operably connected to an optical source such as a laser may include elements such as mirrors, lenses, filters, or other optical components that impacts one or more properties of the optical beam output, but that do not directly control the laser itself.

Similarly, a refractive index optimize operably connected to a detector may include control of the output beam to ensure it is properly directed to the detector. Of course, operably connected also includes aspects where there is a more direct physical interconnection, such as a refractive index optimizer comprising a positioner that results in physical movement of a laser, detector and/or component of the optical collection system.

"Positioner" is used broadly to refer to any known means in the art to reliably move a component, including to the micron level, in a reliable and repeatable manner. Examples include, but are not limited to, electric motors, piezoelectric actuators, spring-loaded drives, micrometer-driven positioning stages, micrometers. The systems and methods provided herein are compatible with manually or automatically controlled positioners. So long as the index of refraction is known, a user or a processor may be used to position an optical component in a desired.

"Optical source" refers to a device or device component that is capable of delivering electromagnetic radiation to a sample. The term is not limited to visible radiation, such as by a visible light beam, but is used in a broad sense to include any electromagnetic radiation. The optical source may be embodied as a laser or laser array, such as a diode laser, diode laser array, diode laser pumped solid-state laser, LED, LED array, gas phase laser, solid-state laser, or combinations thereof. Unless described otherwise, the term optical laser may be replace The term "electromagnetic radiation" and "light" are used synonymously in the present description and refer to waves of electric and magnetic fields. Electromagnetic radiation useful for the methods of the present invention includes, but is not limited to ultraviolet light, visible light, infrared light, or any combination of these having wavelengths between about 100 nanometers (nm) to about 15 microns (μm).

The expression "detecting a particle" broadly refers to sensing, identifying the presence of and/or characterizing a particle. In some embodiments, detecting a particle refers to counting particles. In some embodiments, detecting a particle refers to characterizing and/or measuring a physical characteristic of a particle, such as diameter, cross sectional dimension, shape, size, aerodynamic size, or any combination of these.

"Particles" refers to small objects which are often regarded as contaminants. A particle can be any material created by the act of friction, for example, when two surfaces come into mechanical contact and there is mechanical movement. Particles can be composed of aggregates of material, such as dust, dirt, smoke, ash, water, soot, metal, minerals, or any combination of these or other materials or contaminants. "Particles" may also refer to biological particles, for example, viruses, spores and microorganisms including bacteria, fungi, archaea, protists, other single cell microorganisms and specifically those microorganisms having a size on the order of 1-15 μm. A particle may refer to any small object which absorbs or scatters light and is thus detectable by an optical particle counter. As used herein, "particle" is intended to be exclusive of the individual atoms or molecules of a carrier fluid, for example water molecules, process chemical molecules, oxygen molecules, helium atoms, nitrogen molecules, etc. Some embodiments of the present invention are capable of detecting, sizing, and/or counting particles comprising aggregates of material having a size greater than 10 nm, 20 nm, 30 nm, 50 nm, 100 nm, 500 nm, 1 μm or greater, or 10 μm or greater. Specific particles include particles having a size selected from 20 nm to 50 nm, 50 nm to 50 μm, a size selected from 100 nm to 10 μm, or a size selected from 500 nm to 5 μm.

The terms "optical liquid particle counter" and "particle counter" are used interchangeably herein and refer to systems capable of detecting particles suspended in a liquid, systems capable of determining the sizes of particles suspended in a liquid, systems capable of counting particles suspended in a liquid, systems capable of classification of particles suspended in a liquid, or any combination of these. A typical optical liquid particle counter is comprised of several components, such as a source for generating a beam of electromagnetic radiation, optics for directing the beam into a region where a fluid sample is flowing, for example a liquid or gas flowing through a flow cell. A typical optical liquid particle counter is also comprised of a photodetector, such as a two-dimensional optical detector, and collection optics for detecting electromagnetic radiation which is obscured, scattered or emitted by particles which pass through the beam, and other electronics for the processing and analysis of electrical signals produced by the photodetector including current to voltage converters and signal filtering and amplification electronics. An optical particle counter may also be comprised of a pump for creating a flow for introducing a liquid sample to the detection region where the electromagnetic beam is present.

"Fluid communication" refers to the arrangement of two or more objects such that a fluid can be transported to, past, through or from one object to another. For example, in some embodiments two objects are in fluid communication with one another if a fluid flow path is provided directly between the two objects. In some embodiments, two objects are in fluid communication with one another if a fluid flow path is provided indirectly between the two objects, such as by including one or more other objects or flow paths between the two objects. In one embodiment, two objects present in a body of fluid are not necessarily in fluid communication with one another unless fluid from the first object is drawn to, past and/or through the second object, such as along a flow path.

The following examples further illustrate the invention but, of course, should not be construed as in any way limiting its scope.

Example 1

This example demonstrates an optical particle counter including a refractive index optimizer that adjusts various aspects of the system (e.g. component positioning, beam properties) to ensure the focal point of the system is positioned within tolerance and the data being generated is accurate. In these systems, the refractive index optimizer is an active design element to ensure electromagnetic radiation is collected, then focused or magnified onto the detector from the ideal point of measure in the sample or flow cell.

Fluid refractive index variances cause a shift in the optical system focal point within the measurement cell which can impact the beam shape and position as well as the region within the cell from which light is collected and properly focused on the detector. Individually, or in combination, these variances can impact the performance of the particle counter in several ways.

Figure 1:
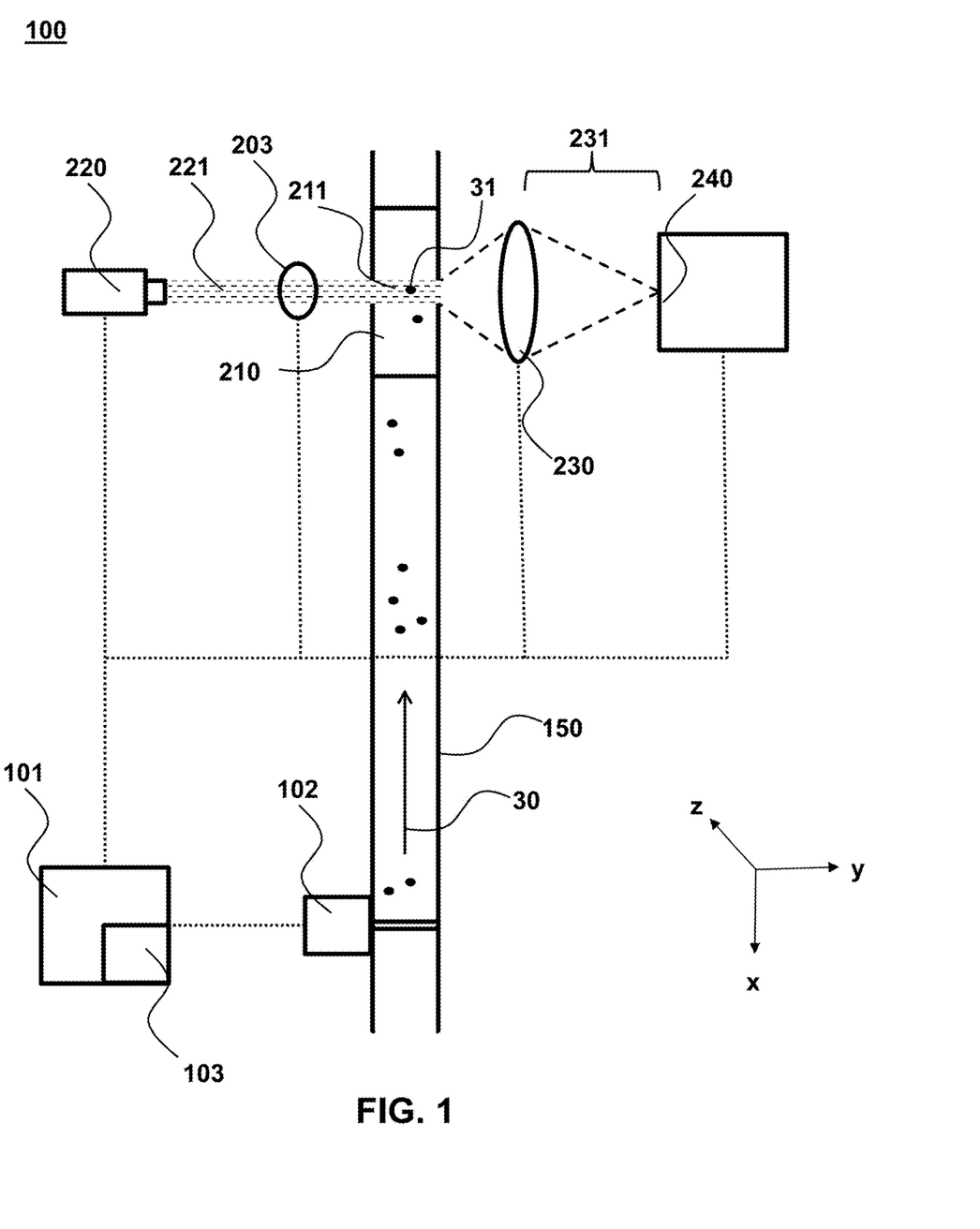
FIG. 1 illustrates an integrated refractive index optimizer and optical particle counter.

An integrated refractive index optimizer and optical particle counter is provided in FIG. 1. As indicated by the dotted lines, refractive index optimizer 101 is operably connected to one or more of the optical source 220, the optical collection system 230, the detection system 240, a refractometer 102 and/or a beam shaping optical assembly 203. A liquid particle counter 100 is provided in fluid communication with the liquid conduit 150 so that the liquid with particles 31 flows through the flow chamber 210 of the particle counter. An optical source 220, such as a laser or light emitting diode, generates a beam of electromagnetic radiation 221 that is passed through the flow chamber 210 such that the beam interacts with particles as they flow through the flow chamber 210 at a viewing region 211 that includes the focal point for the particular fluid in the flow chamber. Transmitted, scattered or emitted electromagnetic radiation is collected by a collection system 230 and directed onto a detector system 240 that generates electrical signals corresponding to particles or characteristics of the particles passing through the flow cell.

The refractive index optimizer may be used to control of a depth of focus 231, so that the transmitted light from the collection system 230 is ideally focused on a plane corresponding to detector elements of detector system 240, thereby further optimizing the collection of the electromagnetic radiation scattered or emitted by particles 31 in flowing fluid 30. Control of depth of focus is by any of a variety of means in the art, including by adjusting position of one or more optical components in any one or more of the x, y and z-directions, and by a focusing or collecting lens and the curvature of such a lens. Similarly, the actual detector 240 may be moved so that the position of detector detection plane corresponds to a depth of focus 231.

Figure 2:
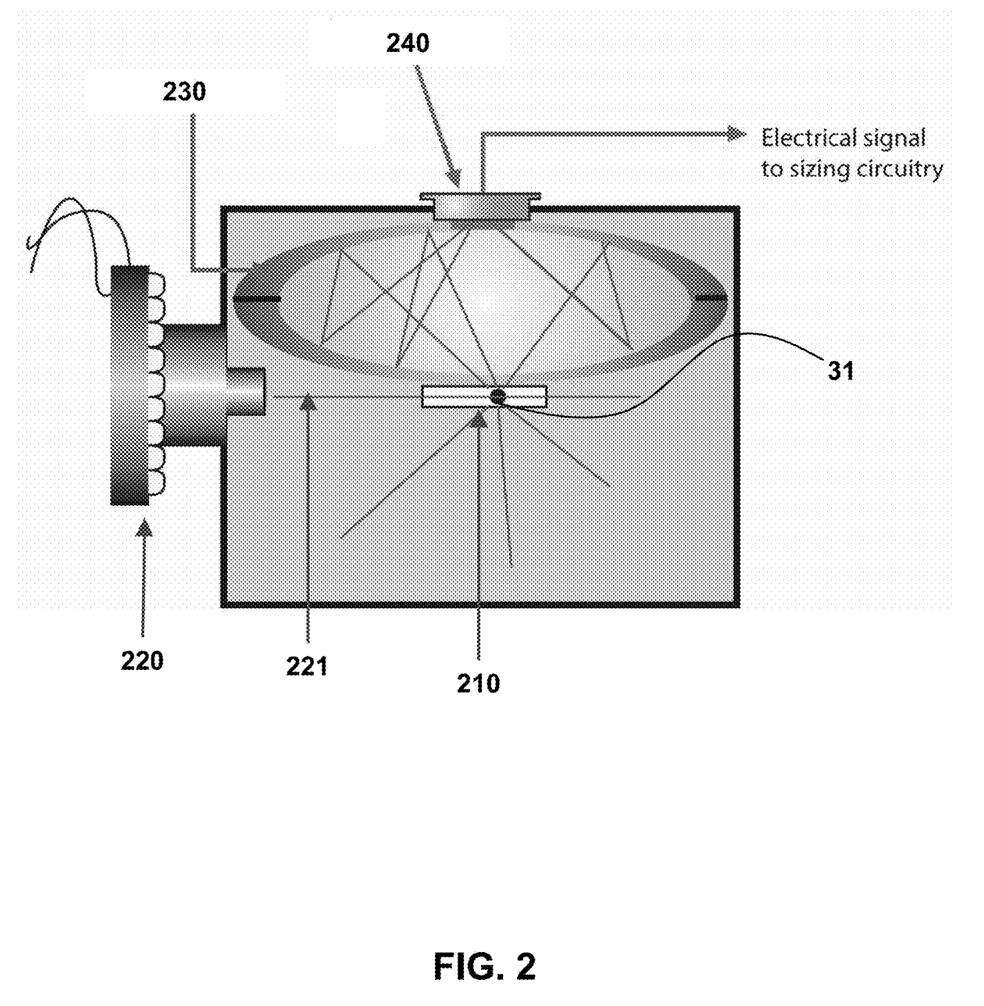
FIG. 2 is a top view of a particle counter, with a flow direction orthogonal to the plane being viewed.

FIG. 1 provides a schematic diagram illustrating an obscuring or eliminating liquid particle counter. The concepts and embodiments described herein, however, are also applicable to other types of particles counters including scattered light or emitted light particle counters. FIG. 2 illustrates, for example, a configuration of a scattering liquid particle counter, wherein the detection system is offset (e.g., by 90°) from the path of the electromagnetic radiation 221 from the optical source 220. FIG. 2 provides a top view of the liquid particle counter, and the flow direction is orthogonal to the plane being viewed. Given this perspective, the fluid monitoring system, provided either upstream or downstream from the flow chamber 210, is not shown in FIG. 2.

As shown in FIG. 1, the refractive index optimizer 101 may adjust for changes in refractive index in a number of different ways. For example, one or more of the optical source 220, optical collection system 230 and/or the detector 240 may include a motor or other means of changing position relative to the other components, allowing for the focal point of the system to be adjusted by the refractive index optimizer 101 when a change in refractive index is input or detected. The analyzers may make adjustments to the position or direction of the various components either off-line or on-line, including X-, Y- or Z-axis shifts and/or rotation about those axis, of one or more components of the optical assembly relative to the ideal focal (measurement) point of the flow cell 210. The refractive index optimizer 101 may be operably connected to the optical source 220 or an optical component (e.g., a beam shaping optical system) 203 and the refractive index optimizer 101 may adjust the beam shape, beam intensity or beam position. The particle counter may have distinct, pre-calibrated positions for various common fluids or refractive indexes.

The refractive index optimizer 101 may be updated with changes in the refractive index of the carrier fluid in a number of ways. For example, the refractive index optimizer may comprise a processor 103 and utilize data received from the detector 240 or other components to calculate or estimate the refractive index of the fluid. The refractive index optimizer 101 may have an input and/or display or be operably connected to an input and/or display of the particle counter system 100 where a user may input the refractive index of the fluid, or the chemical composition and/or concentration of the fluid and the refractive index optimizer 101 then uses a lookup table or algorithm to determine the refractive index. A refractometer 102 (or similar device) may be provided in fluid communication with the carrier fluid (ether via the conduit 150 or the flow chamber 210) and in data communication with the refractive index optimizer 101. The refractometer 102 may provide a calculated or estimated refractive index to the refractive index optimizer 101, for example, in real time. The refractometer 102 may also provide a signal via data communication to the refractive index optimizer 101 which then interprets or calculates the refractive index of the fluid.

Additionally, the described systems and methods may utilize auto-focusing methods to adjust for a change in refractive index of the carrier fluid. Typically, a laser is used for generating a beam of electromagnetic radiation. Particles along the fluid flow path flow through the electromagnetic radiation as does the molecules of the flowing fluid itself. When the scattered light collection focusing optics are aligned for a known fluid with refractive index, the root mean square spot size and, hence, the image of the scattered light of either the particles or the molecules will be focused on the detectors. The molecular scatter of the fluid caused by the impinging laser, produces, by itself an image of the laser's electromagnetic radiation inside the fluid and is imaged by the system detector. This laser image can by analyzed by auto-focusing methods. When applying multi-dimensional array detection, auto-focus can be achieved thru, for example, Contrast Detection Auto-Focusing (CDAF) or Phase Detection Auto-Focusing (PDAF) methods. With single or discrete detection, a change in sample fluid changes the refractive index causing a defocus of the image on the detector and a loss in collected incident power. These auto-focus methods and the power loss can be real-time output information to the refractive index optimizer for reshaping of both the laser beam and scattered light collection through optical lens assembly movements for refocusing and maximizing the power of both the laser's electromagnetic radiation and the particle scattered radiation.

Figure 3:
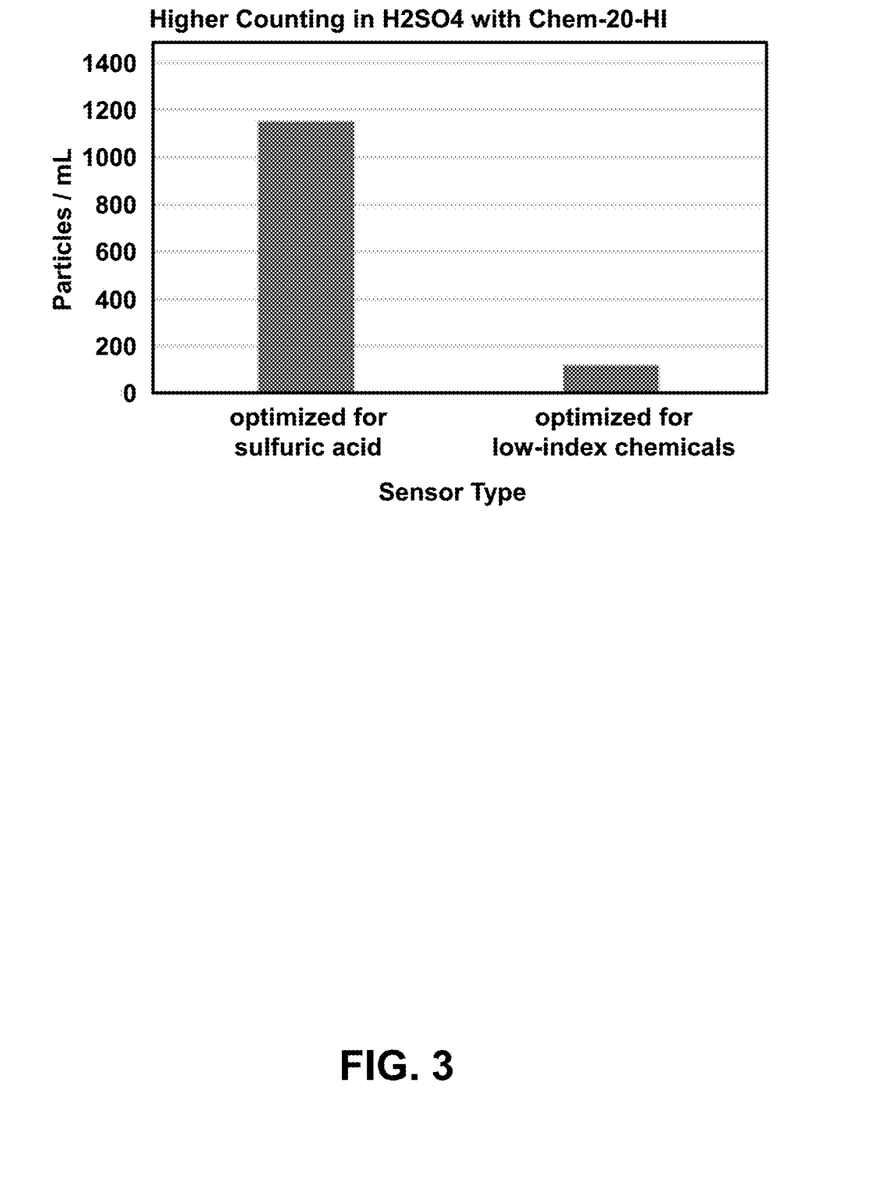

FIG. 3 compares particles detected by an optical particle in sulfuric acid. The left side of the graph represents the number of particles detected using a particle counter specifically calibrated to detect in a high index of refraction (~1.6), while the right represents analysis of the same fluid using a particle counter calibrated to detect particles in a low index of refraction fluid (~1.3), such as water. FIG. 3 illustrates that using a particle counter that is not calibrated to account for index of refraction, in this example, leading to lower detectability due to the higher index of refraction.

Statements Regarding Incorporation by Reference and Variations

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising,"

"having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example, a temperature range, a refractive index range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An optical particle analyzer comprising:
    an optical source for generating a beam of electromagnetic radiation;

a flow chamber for flowing a fluid containing particles along a flow direction through the beam of electromagnetic radiation, thereby generating scattered or emitted electromagnetic radiation;

an optical collection system for collecting and directing said scattered or emitted electromagnetic radiation from a viewing region onto a detector;

a refractive index optimizer operably connected to one or more of said optical source, said optical collection system or said detector to control a focal point of said beam of electromagnetic radiation in said flowing fluid of particles based on a refractive index of said flowing fluid and optimize the collection of said electromagnetic radiation by said detector, wherein said refractive index is from a continuously measured light scattering from molecules of said fluid to increase the amount of electromagnetic radiation reaching said detector and maximize a signal output of said optical particle analyzer.

2. The optical particle analyzer of claim 1, wherein said refractive index optimizer comprises a beam shaping optical assembly optically positioned between said optical source and said flow chamber; wherein said refractive index optimizer adjusts a beam shape or a beam position of said electromagnetic radiation in said flow chamber.

3. The optical particle analyzer of claim 1, wherein said refractive index optimizer comprises a positioner and/or optical component operably connected to said optical source to adjust a direction of said beam of electromagnetic radiation generated by said optical source, wherein the optical source is a laser.

4. The optical particle analyzer of claim 3, wherein said refractive index optimizer comprises a positioner to move said laser or to move said optical component that controls the direction and/or shape of said beam of electromagnetic radiation that is output by said laser.

5. The optical particle analyzer of claim 1, wherein said refractive index optimizer is operably connected to said optical collection system and adjusts a depth of focus of said collection system relative to said flow chamber to correspond to a position of said detector.

6. The optical particle analyzer of claim 1, wherein said refractive index optimizer comprises a positioner operably connected to said detector to adjust a position of said detector relative to said flow chamber.

7. The optical particle analyzer of claim 1, wherein said refractive index optimizer comprises a positioner to adjust a three-dimensional position of one or more of said optical source, said collection system or said detector in one or more of the x-axis, the y-axis, or the z-axis.

8. The optical particle analyzer of claim 1, wherein said refractive index optimizer is configured to position one or more of said optical source, said optical collection system or said detector to maximize an output signal from said detector based on the fluid refractive index.

9. The optical particle analyzer of claim 1, wherein said refractive index is input into said optical particle analyzer or said refractive index optimizer by a user.

10. The optical particle analyzer of claim 1 further comprising a refractometer operably connected to said flow chamber and said refractive index optimizer;

wherein said refractometer measures said refractive index and provides said refractive index to said refractive index optimizer.

11. The optical particle analyzer of claim 10, further comprising a processor operably connected to said refractometer and said refractive index optimizer;

wherein said processer is configured to:
determine, based on the measured refractive index, said focal point; and
send a control signal to said refractive index optimizer to control one or more of a direction of said beam of electromagnetic radiation, an optical parameter of said optical collection system, or a position of said detector to optimize the collection of said electromagnetic radiation by said detector.

12. The optical particle analyzer of claim 1, wherein said refractive index optimizer is configured to provide Contrast Detection Auto-Focusing (CDAF) or Phase Detection Auto-Focusing (PDAF).

13. The optical particle analyzer of claim 1, wherein said flowing fluid has a refractive index selected from a range of 1.3 to 1.6.

14. An optical particle analyzer comprising:
a laser for generating a beam of electromagnetic radiation;
a flow chamber configured to flow a fluid containing particles along a flow direction through the beam of electromagnetic radiation at a viewing region, thereby generating scattered or emitted electromagnetic radiation;
an optical collection system;
a detector in optical communication with said optical collection system, wherein said optical collection system collects and directs said scattered or emitted electromagnetic radiation from said viewing region onto said detector;
a beam shaping optical assembly operably connected to said laser, wherein said beam shaping optical assembly adjusts a beam shape or a beam position of said electromagnetic radiation;
wherein said beam shaping optical assembly adjusts said beam shape or said beam position based on a refractive index of said fluid, and said refractive index is from a continuously measured light scattering from molecules of said fluid.

15. The optical particle analyzer of claim 14 further comprising a refractometer operably connected to said flow chamber for determining said refractive index of said fluid;
a processor operably connected to said refractometer and said beam shaping optical assembly, wherein said processor is configured to:
determine, based on said refractive index, an optimal beam shape and/or beam position; and
control the beam shaping optical assembly to optimize said beam shape and/or position.

16. The optical particle counter of claim 14, wherein said refractive index optimizer is configured to provide Contrast Detection Auto-Focusing (CDAF) or Phase Detection Auto-Focusing (PDAF).

17. A method for maximizing a signal output of an optical particle counter comprising the steps of:
providing an optical particle analyzer comprising:
a laser for generating a beam of electromagnetic radiation;
a flow chamber for flowing a fluid containing particles along a flow direction through the beam of electromagnetic radiation, thereby generating scattered or emitted electromagnetic radiation;
an optical collection system for collecting and directing said scattered or emitted electromagnetic radiation from a viewing region onto a detector;
a beam shaping optical assembly operably connected to said laser;
flowing a fluid through the flow chamber;

continuously measuring the refractive index of said fluid in said flow chamber based on measuring light scattering from molecules of said fluid; and adjusting at least one of:
said beam shaping optical assembly to a beam shape and/or a beam position of said electromagnetic radiation entering said flow chamber based on said measured refractive index, or a position of said laser, said optical collection system, said detector or any combination thereof based on said measured refractive index to optimize the depth of focus of said electromagnetic radiation entering said flow chamber and/or imparted to the detector;

thereby increasing the amount of electromagnetic radiation reaching said detector and maximizing said signal output of said optical particle counter.

18. The method of claim 17, wherein the refractive index is automatically measured by a refractometer operably connected to said fluid.

19. The method of claim 18, wherein the refractive index is a time-varying refractive index.

20. The method of claim 17, comprising adjusting said beam shaping optical assembly to a beam shape and/or a beam position of said electromagnetic radiation entering said flow chamber.

21. The method of claim 17, comprising adjusting a position of said laser, said optical collection system, said detector or any combination thereof.

* * * * *